United States Patent
Hirohama et al.

(10) Patent No.: US 6,941,803 B2
(45) Date of Patent: Sep. 13, 2005

(54) TIRE PRESSURE MONITORING APPARATUS AND PROCESS

(75) Inventors: Tetsuro Hirohama, Kanagawa (JP); Kazuhiko Ito, Saitama (JP); Suguru Nakayama, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 59 days.

(21) Appl. No.: 10/760,724

(22) Filed: Jan. 21, 2004

(65) Prior Publication Data

US 2004/0217854 A1 Nov. 4, 2004

(30) Foreign Application Priority Data

Jan. 22, 2003 (JP) .................................. 2003-013541
Mar. 13, 2003 (JP) .................................. 2003-067695
Sep. 2, 2003 (JP) .................................. 2003-309773

(51) Int. Cl.[7] .......................................... B60C 23/02
(52) U.S. Cl. ................................................ 73/146.5
(58) Field of Search .................. 73/146, 146.2–146.8; 340/425.5, 431, 442–448

(56) References Cited

U.S. PATENT DOCUMENTS

| | | | | | |
|---|---|---|---|---|---|
| 5,483,827 | A | * | 1/1996 | Kulka et al. | 73/146.5 |
| 5,731,754 | A | * | 3/1998 | Lee et al. | 340/447 |
| 6,087,930 | A | * | 7/2000 | Kulka et al. | 340/447 |
| 6,112,585 | A | * | 9/2000 | Schrottle et al. | 73/146 |
| 6,369,712 | B2 | * | 4/2002 | Letkomiller et al. | 340/572.1 |
| 6,630,885 | B2 | * | 10/2003 | Hardman et al. | 340/505 |

FOREIGN PATENT DOCUMENTS

JP  2000-71726 A  3/2000

* cited by examiner

Primary Examiner—William Oen
(74) Attorney, Agent, or Firm—Foley & Lardner LLP

(57) ABSTRACT

A tire pressure monitoring apparatus includes transmitter units provided, respectively, for sensing tire pressures of a vehicle, and receiver units for receiving wireless signals from the transmitter units. A tire pressure monitoring controller registers tire identification code transmitted from each transmitter unit, by measuring signal strengths of wireless signals, and comparing the signal strengths.

13 Claims, 13 Drawing Sheets

SINGLE TRANSMISSION DATA UNIT (EIGHT DATA SETS)

DATA FROM NON-NEAREST TRANSMITTER

DATA FROM NEAREST TRANSMITTER

FIG.6

| n | IDn STORED IN RAM | Anm STORED IN RAM m | | | | SUM OF Anm VALUES | GREATEST Anm SUM (ID TO BE REGISTERED) |
|---|---|---|---|---|---|---|---|
| | | 1 | 2 | 3 | 4 | | |
| 1 | ID1 | A11 | A12 | A13 | | A11+A12+A13 | |
| 2 | ID2 | A21 | A22 | A23 | A24 | A21+A22+A23+A24 | ○(ID2) |
| 3 | ID3 | A31 | A32 | | | A31+A32 | |
| 4 | ID4 | A41 | A42 | A43 | | A41+A42+A43 | |
| 5 | ID5 | A51 | | | | A51 | |

FIG.8

|  | R1 | R2 | R3 | R4 |
|---|---|---|---|---|
| TRANSMITTER ID 1 | 50dBμV | 45 | 40 | 45 |
| TRANSMITTER ID 2 | 45dBμV | 50 | 45 | 40 |
| TRANSMITTER ID 3 | 40dBμV | 45 | 50 | 45 |
| TRANSMITTER ID 4 | 45dBμV | 40 | 45 | 50 |

FIG.9

|  | R1 | R2 | R3 | R4 |
|---|---|---|---|---|
| TRANSMITTER ID 5 (IN PLACE OF ID1) | 70 | 65 | 60 | 65 |
| TRANSMITTER ID 2 | 45 | 50 | 45 | 40 |
| TRANSMITTER ID 3 | 40 | 45 | 50 | 45 |
| TRANSMITTER ID 4 | 45 | 40 | 45 | 50 |

TIRE PRESSURE MONITORING APPARATUS AND PROCESS

BACKGROUND OF THE INVENTION

The present invention relates to technique of determining a tire position of each tire and registering tire identification codes at the respective tire positions.

A Published Japanese Patent Application Publication No. 2000-71726 shows a tire air pressure monitoring system for registering tire identification codes.

SUMMARY OF THE INVENTION

The tire air pressure monitoring system of the above-mentioned patent application is arranged to receive information on tire identification transmitted from tire pressure sensors, with a single receiver. Therefore, this system is unable to register tire identification codes correctly at four tire positions of a vehicle. In order to determine tire positions of identification codes, it is necessary to set tire pressures of tires at different levels. However, the tire pressure difference must be set so small as not to adversely affect the vehicle steering stability. Therefore, the setting of tire pressures is very troublesome in the case of tire replacement and tire rotation.

It is an object of the present invention to provide tire pressure monitoring apparatus and/or process for registering tire identification codes accurately and easily at tire positions.

According to one aspect of the present invention, a tire pressure monitoring apparatus comprises: a plurality of transmitter units provided, respectively, for tires of a vehicle, each of the transmitter units includes a pressure sensor to sense a tire pressure of the corresponding one of the tires to determine a sensed tire pressure, and a transmitting device to transmit a wireless signal to covey information on the sensed tire pressure and a tire identification code for identifying the corresponding one of the tires; a receiving section provided in the vehicle and arranged to receive the wireless signals from the transmitter units, the receiving section including a plurality of receiver units each provided near a unique one of the tires of the vehicle; and a controller to register the tire identification code of each tire. The controller is configured; to measure signal strengths of wireless signals when the wireless signals are received by the receiving section; and to register the tire identification code of each tire by comparing the signal strengths.

According to another aspect of the invention, a tire pressure monitoring process comprises: receiving wireless signals at a plurality of tire proximity positions in a vehicle from transmitter units provided, respectively, for tires of the vehicle, to sense a tire pressure of the corresponding one of the tires to determine a sensed tire pressure, and to transmit a wireless signal to covey information on the sensed tire pressure and a tire identification code for identifying the corresponding one of the tires; measuring signal strengths of the wireless signals received at the tire proximity positions; and registering the tire identification code of each tire by comparing the signal strengths.

According to another aspect of the invention, a tire pressure monitoring apparatus comprises: transmitting means for transmitting wireless signals each containing information on a sensed tire pressure of a unique one of tires of a vehicle, and a tire identification code identifying the unique one of the tires; receiving means for receiving the wireless signals from the transmitting means at tire proximity positions each located near a unique one of the tires of the vehicle; measuring means for measuring signal strengths of the wireless signals; and registering means for registering the tire identification code of each tire by comparing the signal strengths.

BRIEF DESCRIPTION OF THE DRAWINGS

FIG. 6 is a table showing data collected in RAM of a tire pressure monitoring controller shown in FIGS. 1 and 2.

FIGS. 8 and 9 are tables showing output values of each transmitter unit at four receiver positions in the case of no transmitter replacement (FIG. 8) and in the case of transmitter replacement (FIG. 9).

DETAILED DESCRIPTION OF THE INVENTION

Figure 1:
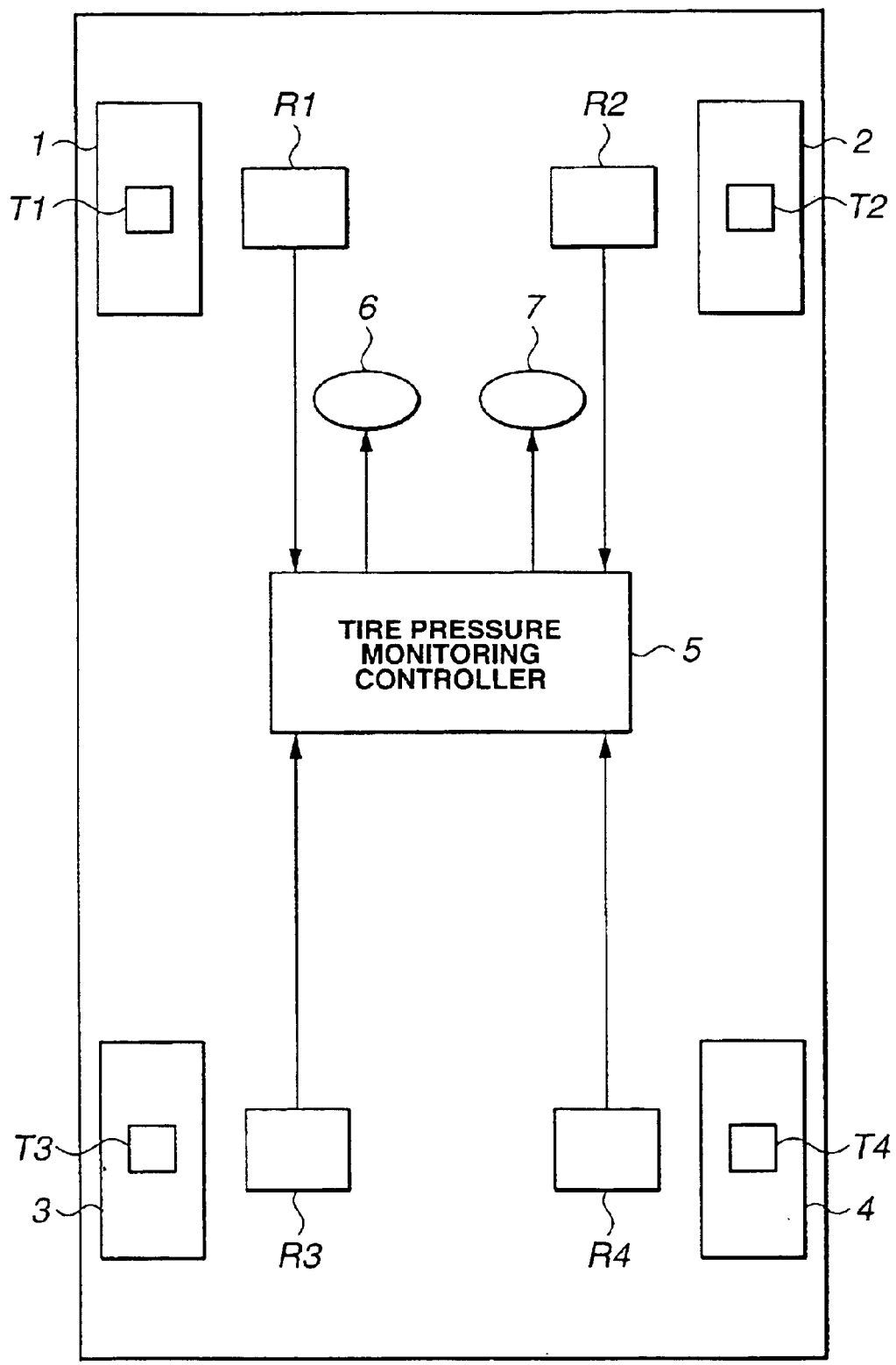
FIG. 1 is a schematic view of a vehicle equipped with a tire pressure monitoring system according to a first embodiment of the present invention.

FIG. 1 shows a vehicle equipped with a tire pressure monitoring system or apparatus according to a first embodiment of the present invention. This tire pressure monitoring system includes a tire pressure sensing section (serving as transmitting means) including four tire pressure sensing transmitter units T1, T2, T3 and T4, respectively, for front left tire 1, front right tire 2, rear left tire 3 and rear right tire 4 of the vehicle; a receiving section (serving as receiving means) including four receiver units R1, R2, R3 and R4 each having an antenna; a tire pressure monitoring (or warning)

controller 5; a display 6; and a tire pressure decrease warning lamp 7.

Transmitter units T1~T4 are mounted on the road wheels of tires 1~4, respectively. Transmitter units T1~T4 are arranged to sense the air pressures of the four tires individually, and to send pressure data (tire pressure information) on the sensed tire pressures and identification codes for identifying the tires 1~4, wirelessly toward receiver units R1~R4.

Receiver units R1~R4 receive wireless signals from transmitter units T1~T4, and input the received information to tire pressure monitoring controller 5.

Tire pressure monitoring controller 5 performs an ID registration for each tire; provides, on a screen of display 6, information about the tire pressure of each tire; and delivers a lamp turn-on command to tire pressure decrease warning lamp 7 when the tire pressure of one of tires 1~4 becomes low.

Figure 2:
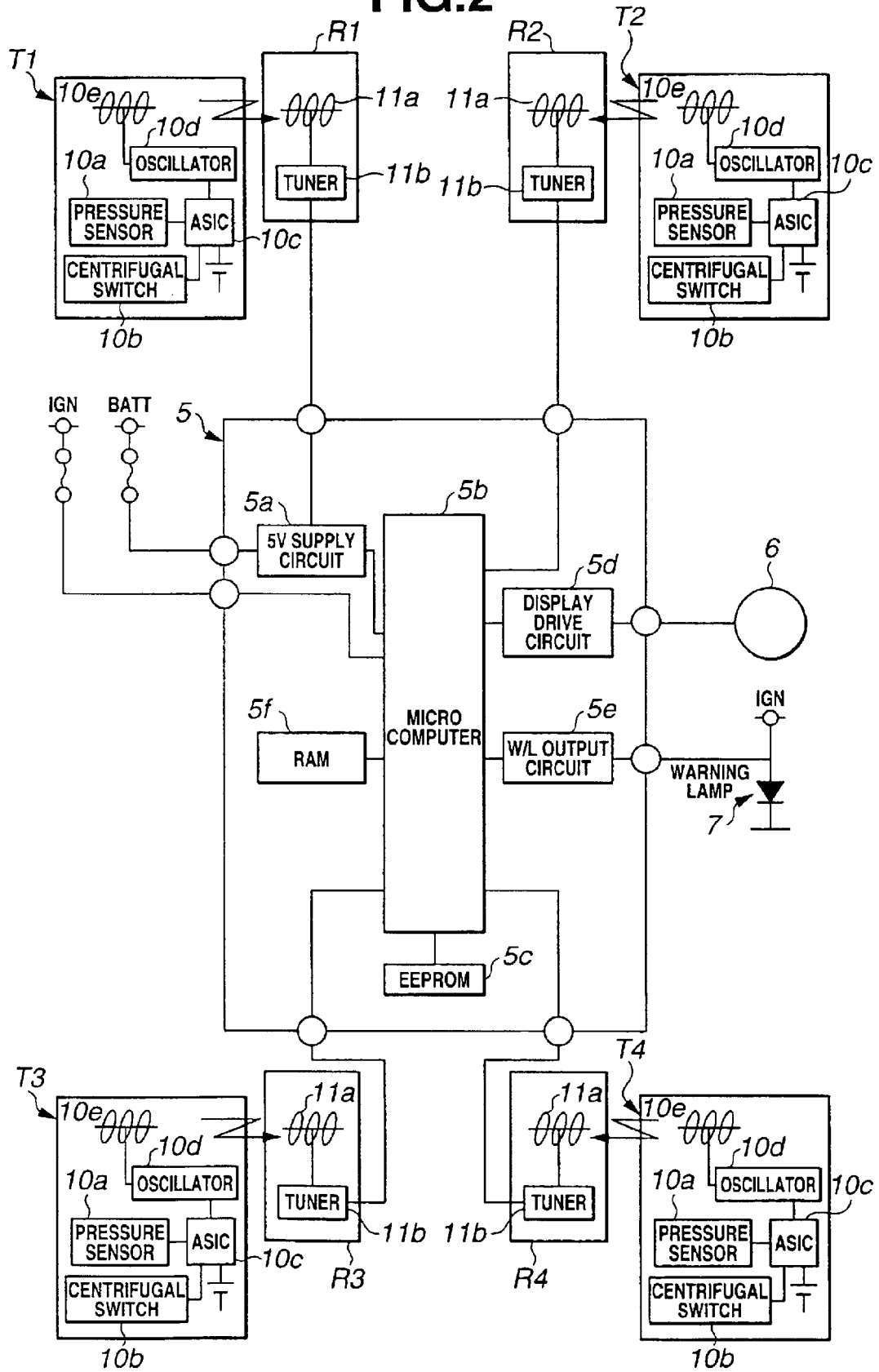
FIG. 2 is a block diagram of the tire pressure monitoring system of FIG. 1.

FIG. 2 shows more in detail the tire pressure monitoring system of the first embodiment.

Each of transmitter units T1~T4 includes a pressure sensor 10a for sensing a tire pressure; a centrifugal switch 10b arranged to turn off in a smaller centrifugal force region in which a centrifugal force applied is small, and to turn on in a great centrifugal force region; an application-specific integrated circuit (ASIC) 10c; an oscillator 10d and an antenna 10e for transmission (serving as a transmitting device). By using, as a trigger, an on/off switching operation of centrifugal switch 10b for prolonging the battery life, each transmitter unit of this example changes a transmission frequency between a first level having a longer transmitting interval (1 hour, for example) for a low vehicle speed region including a rest state, and a second level having a short transmitting interval (1 minute, for example) for a higher vehicle speed region.

Each of receiver units R1~R4 includes an antenna 11a for receiving data from transmitter units T1~T4; and a tuner 11b serving as a receiving circuit.

Tire pressure monitoring controller 5 includes a 5V power supply circuit 5a; a micro computer 5b for receiving data from tuners 11b of receiver units R1~R4 and performing information processing operations; a memory section 5c which, in this example, includes electrically erasable EEPROM for ID registration; a display drive circuit 5d to deliver a display drive command to display 6 to display information on tire pressures of tires 1~4, based on the received data; a warning lamp output (or drive) circuit 5e for delivering a tire pressure warning command to tire pressure decrease warning lamp 7 in case of tire pressure decrease; and a memory section 5f of RAM for temporarily storing information such as tire identification codes IDn and accumulated values (or sums) Anm.

Figure 3:
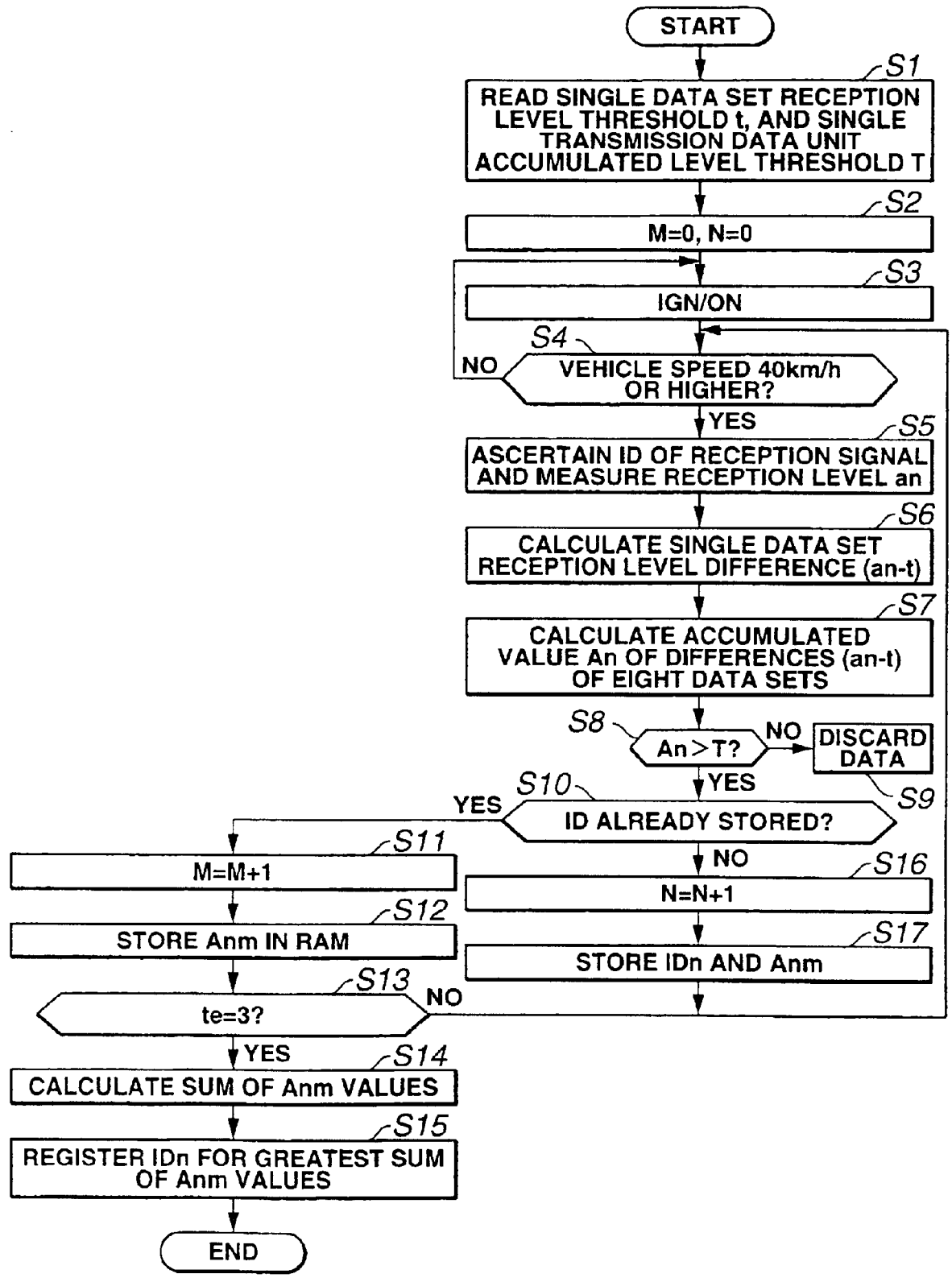
FIG. 3 is a flowchart of a tire identification registering process performed by the tire pressure monitoring system according to the first embodiment.

FIG. 3 shows an automatic ID registration process performed by tire pressure monitoring controller 5 according to the first embodiment, for registering the tire ID code of each tire. (A flowchart of FIG. 3 corresponds to a tire identification code registering means.)

At a first step S1, controller 5 reads a predetermined single data set reception level threshold t, and a predetermined single transmission data unit (consecutive eight data sets) accumulated level threshold T. After S1, controller 5 proceeds to a next step S2.

At S2, controller 5 resets each of a first ID count M for already-memorized IDs (S11) and a second ID count N for not-yet-memorized IDs (S16), to zero as initial value.

Thereafter, controller 5 proceeds to S3 to check a vehicle main switch which, in this example, is an ignition switch of the vehicle.

When the ignition switch is ON, controller 5 examines whether the vehicle speed is higher than or equal to a predetermined speed. In this example, the predetermined speed is 40 km/h. In the case of YES, controller 5 proceeds from S4 to S5 on the assumption that the system is in a state capable of receiving data. In the case of NO, controller 5 returns to S3.

At S5, controller 5 checks data received by the receiving section, and ascertains an ID of wireless reception signal and a reception level an of the reception signal. Thereafter, controller 5 proceeds to S6. (Step S5 corresponds to a reception level measuring means for measuring the reception level of a received wireless signal.) The reception level an is a single data set reception level for each data set.

At S6, controller 5 calculates a single data set reception level difference (an−t) which is a difference between the measured single data set reception level an and the reception level threshold t (obtained at S1); and then proceeds to S7. (Step S6 corresponds to a single data set reception level difference calculating means.)

At S7, controller 5 calculates an accumulated value An of a predetermined number of single data reception level differences. Each single transmission data unit is a series of data sets transmitted consecutively in a single transmission operation. In this example, the accumulated value An is a sum of eight single data set reception level differences of eight data sets received consecutively. (Step S7 corresponds to an accumulated value calculating means.) After S7, controller 5 proceeds to S8.

At S8, controller 5 compares the accumulated value An with the accumulated data reception level threshold T obtained at S1, to determine whether An is greater than T. The accumulated data reception level threshold T is equal to 50 dB $\mu$V, for example. When An$\leq$T, controller 5 considers that the distance between the receiver unit and transmitter unit is not short enough, and proceeds to S9. At S9, controller 5 discards the received data since the spatial relationship between the transmitter unit and receiver unit is not a proximate relationship. When An>T, controller 5 considers that the receiver unit is in proximity with the transmitter unit, and proceeds to S10.

At S10, controller 5 examines whether ID of the received data is identical to ID stored previously. From S10, controller 5 proceeds to S11 when there is one identical ID already stored, and to S16 when ID of the received data is different from the stored IDs.

At S11, controller 5 increments (increases by one) the count M for the already-memorized ID, and then proceeds to S12.

At 512, controller 5 stores the accumulated value Anm (An1, An2, An3, An4) in RAM 5f, and then proceeds to S13.

At S13, controller 5 checks an elapsed time te from the start of the operation of storing the accumulated values Anm in RAM 5f, and determines whether the elapsed time te becomes equal to a predetermined time length (which, in this example, is 3 minutes). From S13, controller 5 returns to S4 in the case of NO, and proceeds to S14 in the case of YES. It is optional to employ a predetermined number of data transmitting operations instead of the predetermined time length (3 min). For example, the predetermined number of data transmitting operations is three. In this case, a tire identification code is registered when the total of accumulated values Anm accumulated within three times of data receptions is greatest.

At S14, controller 5 calculates a total of accumulated values for each IDn (ID1, ID2, ID3, ID4, ID5), and then proceeds to S15.

At S15, controller 5 registers, in EEPROM 5c, IDn of the maximum value among the sums of the accumulated values Anm. (In an example shown in FIG. 6, ID2 is registered.)

At S16, controller 5 increments the count N for different Ids, and then proceeds to S17.

At S17, controller 5 stores IDn and the accumulated value Anm (An1, An2, An3, An4) in RAM 5f, and then returns to S4.

Figure 4:
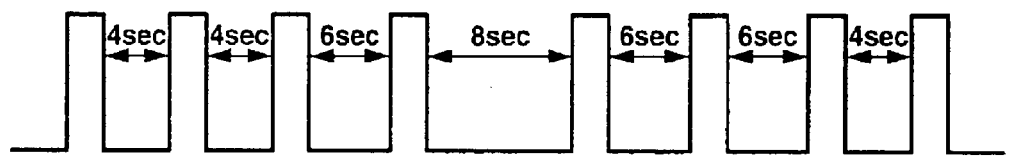
FIG. 4 is a view illustrating one transmission data unit transmitted from each transmitter units T1~T4 shown in FIG. 2.

FIG. 4 shows one transmission data unit which is data transmitted as a unit in one transmitting operation from one of transmitter units T1~T4. As shown in FIG. 4, a single transmission data unit of this example is composed of eight transmission data sets transmitted consecutively at irregular transmission intervals. In this example, seven intervals between adjacent two of the eight data sets are: 4 sec, 4 sec, 6 sec, 8 sec, 6 sec, 6 sec and 4 sec, as shown in FIG. 4. In this example, each of transmission data sets contains at least a start bit, a function code, ID, pressure data, and check sum.

Figure 5A:
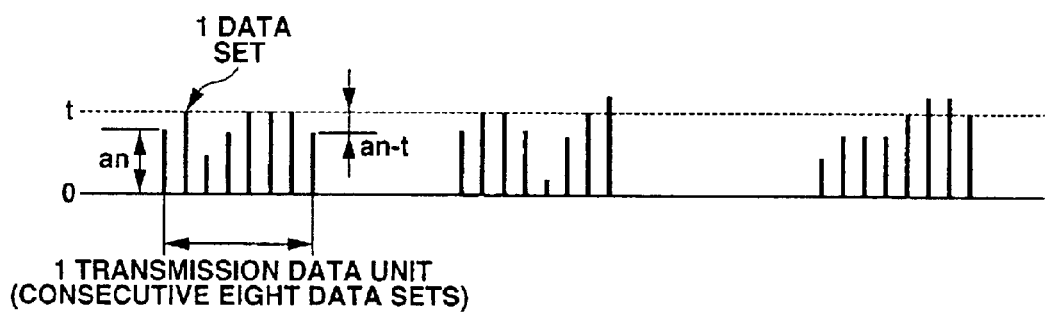
FIGS. 5A and 5B are views illustrating a transmission data unit received by one transmitter unit at a non-nearest position, and a transmission data unit received by one transmitter unit at a nearest position in the system of FIG. 2.
Figure 5B:
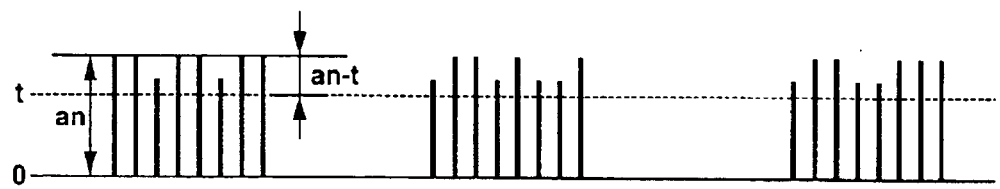

FIGS. 5A and 5B show transmission data from transmitters T1~T4. FIG. 5B shows transmission data received by one receiver unit from the transmitter at the nearest position. FIG. 5A shows transmission data from a wheel of another vehicle, or a wheel of the vehicle at another (non-nearest) position. When, for example, the second receiver unit R2 receives data from transmitter units T1~T4 in the vehicle having transmitter units T1~T4 and receiver units R1~R4 arranged as shown in FIG. 1, the tire pressure monitoring system is operated as follows:

From the non-nearest transmitter units T1, T3 and T4, the second receiver unit R2 receives data as shown in FIG. 5A. In this case, the reception level is lower; the difference (an−t) is smaller than zero or close to zero, and the accumulated value An of the differences (an−t) for eight consecutive data sets becomes a small positive value or a negative value. In the flowchart of FIG. 3, controller 5 reaches step S8 by the flow of S1→S2→S3→S4→S5→S6→S7→S8; and further proceeds to S9 when the accumulated value An is smaller than or equal to accumulated level threshold T. Thus, among the data received by second receiver unit R2 from transmitter units T1, T3 and T4, controller 5 destroys data for which An≦T.

When second receiver unit R2 receives data from the adjacent second transmitter unit T2, the received data is like FIG. 5B. In this case, the reception level is higher; the difference (an−t) is greater than zero; and the accumulated value An of the differences (an−t) for eight consecutive data sets becomes greater than zero. In the flowchart of FIG. 3, controller 5 reaches step S8 by the flow of S1→S2→S3→S4→S5→S6→S7→S8; and further proceeds to S10, S11 and S12 when the accumulated value An is greater than accumulated level threshold T. Thus, the accumulated value Anm is stored in RAM 5f.

The tire pressure monitoring system repeats the flow of S1→S2→S3→S4→S5→S6→S7→S8→S10→S11→S12 until the expiration of the predetermined time (3 min). By this repetition, controller 5 collects tire identification codes IDn and accumulated values Anm in RAM 5f. The number of accumulated values of transmission data received from transmitter units at remote positions from the second receiver unit R2 tends to be smaller.

For example, as shown in FIG. 6, RAM 5f stores accumulated values A11, A12 and A13 for tire identification code ID1 of front left wheel 1; A21, A22, A23 and A24 for tire identification code ID2 of front right wheel 2; A31 and A32 for tire identification code ID3 of rear left wheel 3; A41, A42 and A43 for tire identification code ID4 of rear right wheel 4; and A51 for the identification code ID5 of a spare tire in the vehicle.

Therefore, the total of A21+A22+A23+A24 calculated at S14 becomes greatest, and the monitoring system automatically registers the tire identification code ID2 of transmission data received by second receiver unit R2 from second transmitter unit T2 as the tire identification code for front right wheel 2.

When a plurality of wireless signals are received, the thus-constructed tire pressure monitoring system according to the first embodiment measures the strengths of radio waves of the wireless signals received by receiver units R1~R4, and registers an ID code by comparing the strengths of radio waves of the wireless signals. Therefore, the tire pressure monitoring system can register tire identification codes accurately for four wheels at the four positions of a vehicle, and eliminate the need for troublesome tire pressure setting operations in the case of tire replacement or tire rotation.

The tire pressure monitoring system according to the first embodiment can register the tire identification code accurately when the battery voltages of the transmitter units T1~T4 are substantially uniform. For example, the battery voltages are uniform among transmitter units when a tire is not replaced (a transmitter unit is not replaced, that is), when tires are rotated in a vehicle, and when batteries of transmitter units T1~T4 are all replaced simultaneously.

With step S5 for measurement of reception levels, S6 for calculation of reception level difference, S7 for calculation of accumulated value and S8 for comparison of accumulated value An with T, the tire pressure monitoring system can improve the reliability of ID registration even if there is transmission loss or reception loss in part of data.

The tire pressure monitoring system temporality stores tire identification codes IDn and accumulated values Anm, and registers the tire identification code corresponding to the greatest sum of accumulated values (at S15). Therefore, the tire pressure monitoring system can register ID accurately by using the temporality stored data without being adversely influenced by another nearby vehicle having a similar transmitter for tire pressure monitoring.

Figure 7:
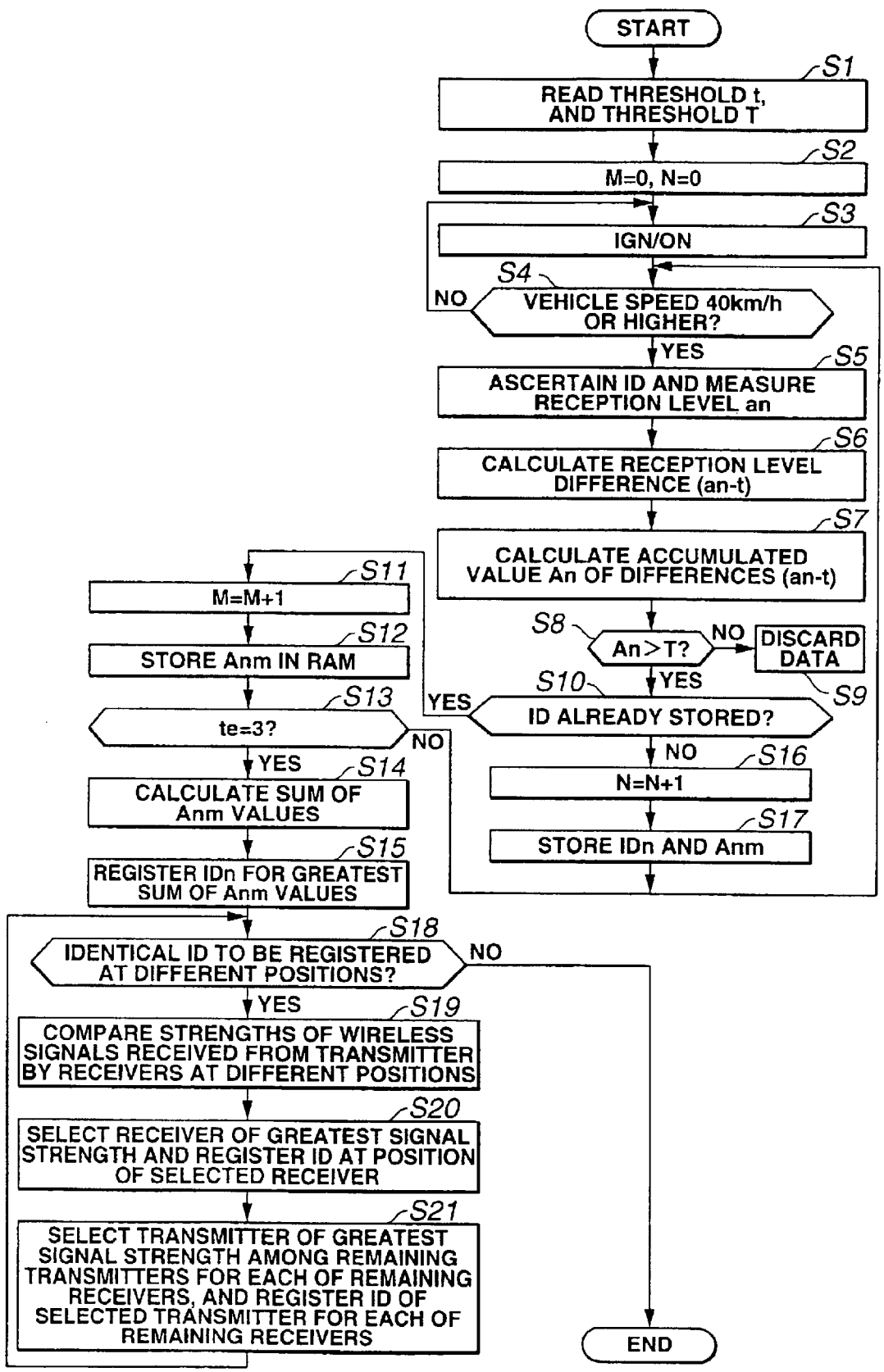
FIG. 7 is a flowchart of a tire identification code registering process performed by a tire pressure monitoring system according to a second embodiment.

FIG. 7 shows an automatic tire ID registering process according to a second embodiment of the present invention. The second embodiment is designed to register tire identification codes accurately even when a tire is replaced by a new tire including a transmitter unit of a higher battery voltage. A tire pressure monitoring system according to the second embodiment is substantially identical in construction to the system of the first embodiment shown in FIGS. 1 and 2. In the following explanation, transmitter units T1~T4 are referred to as transmitters ID1~ID4 and a transmitter unit of a new tire is referred to as transmitter ID5.

Steps S1~S17 are substantially identical to S1~S17 of FIG. 3. (FIG. 7 corresponds to the tire identification code registering means.)

At step S18 following S15, controller 5 checks whether one ID (ID5 in an example of FIG. 9) is to be registered at different tire positions as the result of step S15 for the greatest sum (total) of Anm values. From S18, controller 5 proceeds to S19 in the case of YES, and ends the process in the case of NO.

At S19, controller 5 compares the strengths of radio waves received by receiver units R1~R4 from the transmitter of the identification code (ID5) to be registered at the different tire positions; and then proceeds to S20.

At S20, controller 5 selects the receiver unit (R1 in the example of FIG. 9) which received the radio waves of the greatest strength among receiver units R1~R4 from the transmitter (ID5), and registers the identification code of the transmitter (ID5) as one at the location of the selected receiver unit. After S20, controller 5 proceeds to S21.

At S21, for each of the remaining receiver units (R2, R3 and R4 in the example of FIG. 9) excluding the receiver unit (R1) for which ID is registered at S20, controller 5 compares the strengths of waves received from the transmitter units (ID2, ID3 and ID4 in the example of FIG. 9) excluding the transmitter (ID5) whose ID is registered; and registers the transmitter's ID of the greatest wave strength as the transmitter at the location of each remaining receiver unit (R2, R3 or R4).

When none of the transmitter units is replaced, controller 5 proceeds from S15 through S18 to END of the program. Therefore, the monitoring system registers, in EEPROM 5c, IDn of the greatest sum (total) of accumulated values Anm for each IDn.

As shown in FIG. 8, by comparing output values from transmitter ID1~ID4, the monitoring system selects transmitter ID1 of a greatest value of 50 dB $\mu$V for first receiver unit R1; transmitter ID2 of a greatest value of 50 dB $\mu$V for second receiver unit R2; transmitter ID3 of a greatest value of 50 dB $\mu$V for third receiver unit R3; and transmitter ID4 of a greatest value of 50 dB $\mu$V for fourth receiver unit R4.

When transmitter ID1 is replaced by transmitter ID5, for example, as shown in FIG. 9, new transmitter ID5 is higher in battery voltage than the remaining transmitters ID2~ID4, and hence the radio wave strength from transmitter ID 5 is higher.

Therefore, the monitoring system according to the first embodiment selects the new transmitter ID5 for all the receiver units R1~R4 since the wave strength of radio waves from new transmitter ID5 is greatest in each of receiver units R1~R4.

In the second embodiment, by contrast, the monitoring system follows the route of S15→S18→S19→S20→S21 since ID5 is to be registered at different tire positions (all the four tire positions in the example of FIG. 9). At S19 and S20, the monitoring system pays attention to transmitter ID5; compares the signal strengths of transmitter ID5 at receiver units R1→R4; and registers transmitter ID5 at the tire position (front left position) corresponding to the receiver unit R1 receiving the signal of a greatest strength of 70 dB $\mu$V. At S21, the monitoring system compares the signal strengths of the remaining transmitters ID2, ID3 and ID4 for each of the remaining receiver units R2, R3 and R4, and select the transmitter of the greatest signal strength for each remaining receiver unit.

As shown in FIG. 9, the tire pressure monitoring system according to the second embodiment performs the wave strength comparison among the receiver units for one transmitter instead of the comparison among the transmitters for each receiver unit; and thereby correctly concludes that the new transmitter ID5 is located at the position adjacent to the first receiver unit R1 at the front left tire position. In this embodiment, it is supposed that one ID is not registered simultaneously at different tire positions.

Then, as shown in FIG. 9, the monitoring system can select transmitter ID2 for receiver unit R2 by comparing the output values from the remaining transmitters ID2, ID3 and ID4; select transmitter ID3 for receiver unit R3 by comparing the output values from the remaining transmitters ID2, ID3 and ID4; and select transmitter ID4 for receiver unit R4 by comparing the output values from the remaining transmitters ID2, ID3 and ID4.

In addition to the advantageous effects obtained by the first embodiment, the second embodiment can register identification codes accurately even if a tire is replaced by a new tire equipped with a transmitter having a higher battery voltage.

Figure 10:
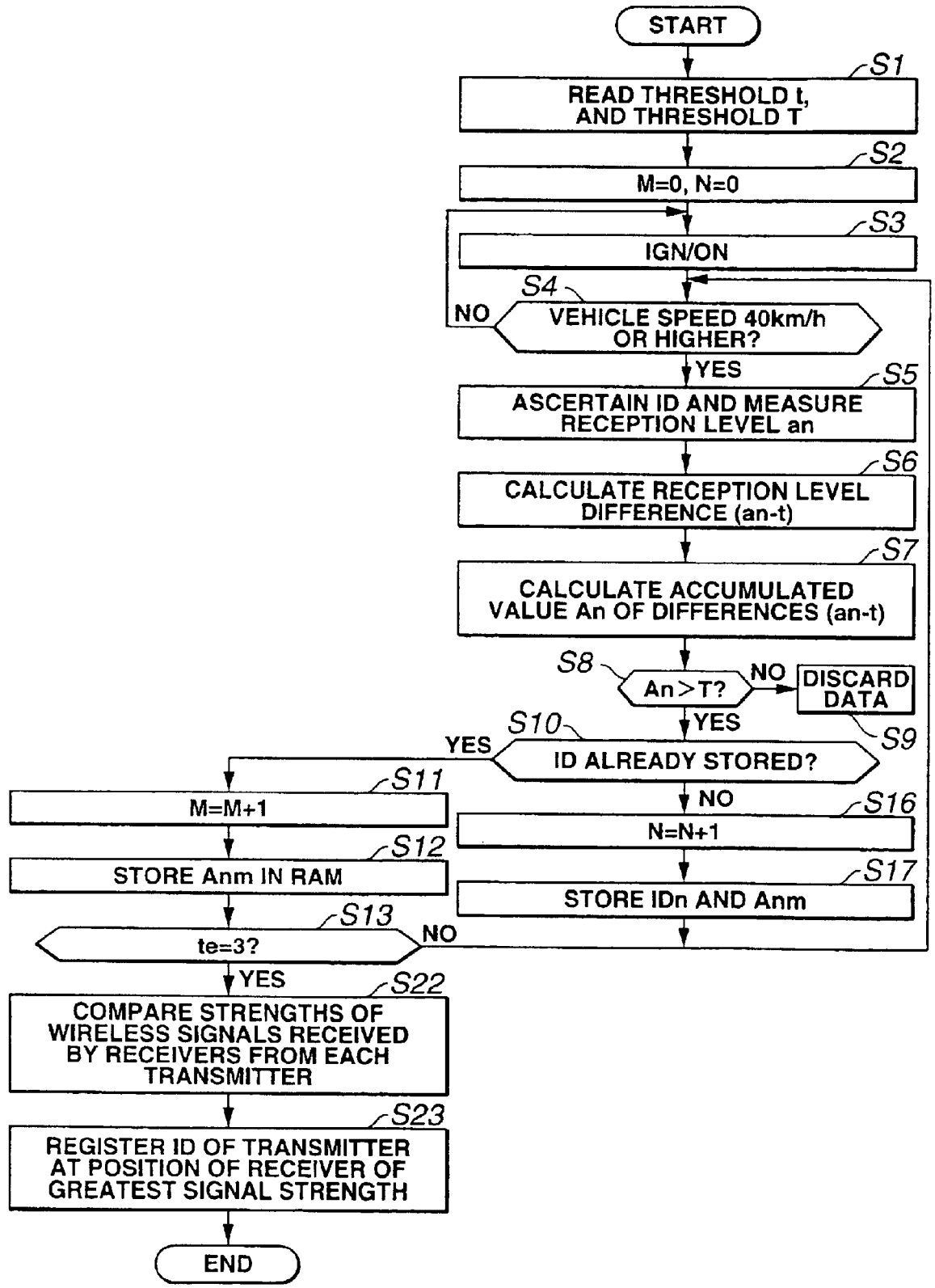
FIG. 10 is a flowchart of a tire identification code registering process performed by a tire pressure monitoring system according to a third embodiment.

FIG. 10 shows an automatic tire ID registering process according to a third embodiment of the present invention. The third embodiment is designed to register tire identification codes accurately without regard to battery voltages of transmitters. A tire pressure monitoring system according to the second embodiment is substantially identical in construction to the system of the first embodiment shown in FIGS. 1 and 2. Steps S1~S13, S16 and S17 are substantially identical to S1~S13, S16 and S17 of FIG. 3.

At step S22 following S13, controller 5 compares signal strengths of wireless signals received by receiver units R1~R4 from each transmitter; and then proceeds to step S23.

At S23, by comparing the strengths of signals from each transmitter received by receiver units R1~R4, controller 5 registers ID of each transmitter at the tire position corresponding to the receiver unit receiving the greatest signal strength, in EEPROM 5c.

When battery voltages of transmitters are not uniform, the comparison of strengths of wireless signals received from the transmitters by each of receiver units tends to lead to erroneous registration. The signal strength does not always represent the distance between transmitter and receiver.

Therefore, the tire pressure monitoring system according to the third embodiment is arranged to select one of receiver units for each transmitter by comparing the signal strengths. In the example shown in FIG. 9, the monitoring system according to the third embodiment selects receiver unit R1 for transmitter ID5 by comparing signal strengths of 70, 65, 60 and 65 at R1, R2, R3 and R4 with one another; selects receiver unit R2 for transmitter ID2 by comparing signal strengths of 45, 50, 45 and 40 at R1, R2, R3 and R4 with one another; selects receiver unit R3 for transmitter ID3 by comparing signal strengths of 40, 45, 50 and 45 at R1, R2, R3 and R4 with one another; and selects receiver unit R4 for transmitter ID4 by comparing signal strengths of 45, 40, 45 and 50 at R1, R2, R3 and R4 with one another. Thus, the monitoring system can register tire identification codes accurately without being adversely influenced by the non-uniformity in battery voltage among transmitters.

When a plurality of wireless signals are received, the thus-constructed tire pressure monitoring system according to the third embodiment like the first embodiment measures the strengths of radio waves of the wireless signals received by receiver units R1~R4, and registers an ID code by comparing the strengths of radio waves of the wireless signals. Therefore, the tire pressure monitoring system can register tire identification codes accurately for four wheels at the four positions of a vehicle, and eliminate the need for troublesome tire pressure setting operations in the case of tire replacement or tire rotation.

Moreover, the monitoring system according to the third embodiment can register identification codes accurately without regard to battery voltages of transmitter.

Figure 11:
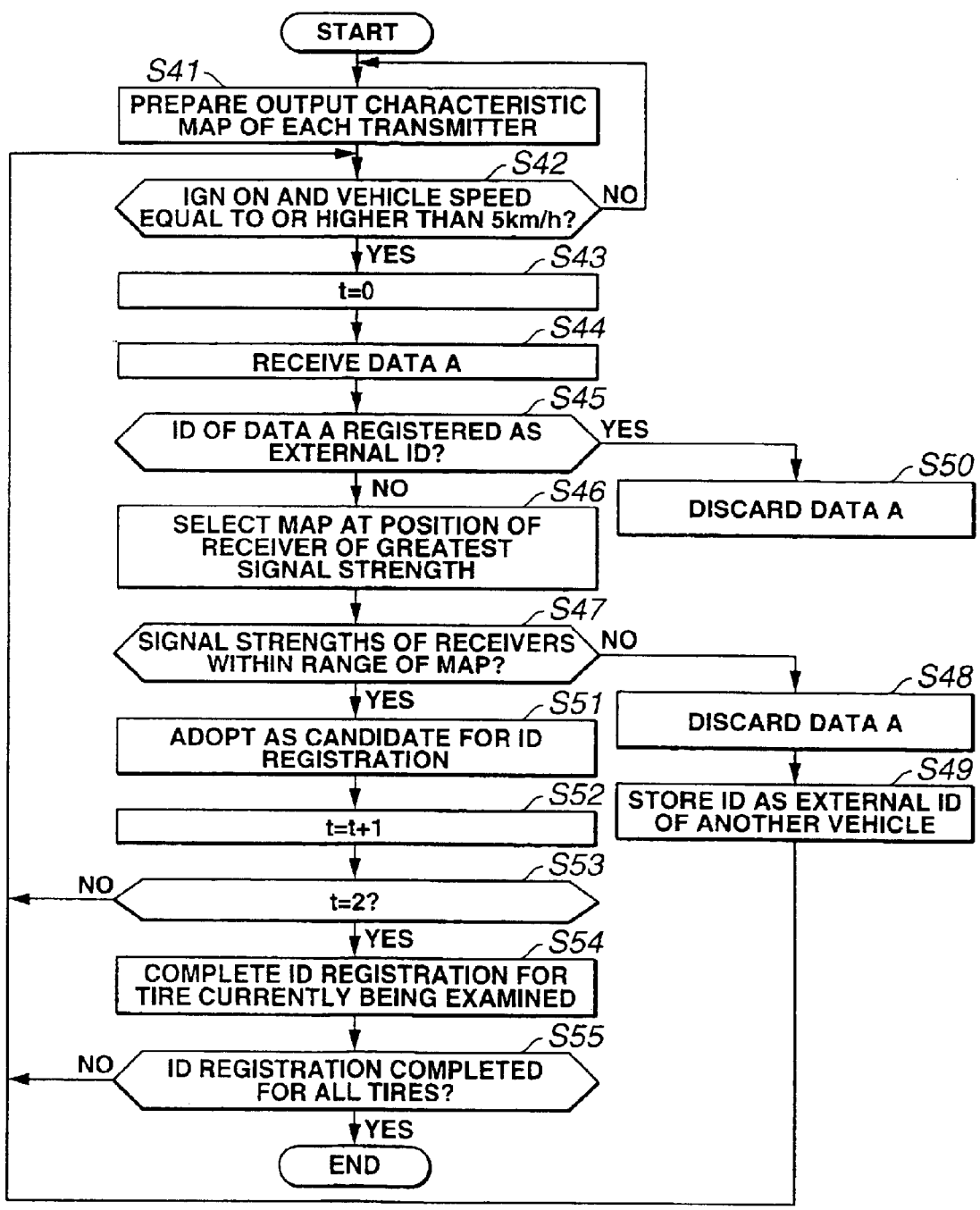
FIG. 11 is a flowchart of a tire identification code registering process performed by a tire pressure monitoring system according to a fourth embodiment.

FIG. 11 shows an automatic tire ID registering process according to a fourth embodiment of the present invention. The fourth embodiment is designed to register tire identification codes accurately even when a vehicle comes close to another vehicle having transmitters in tires. A tire pressure monitoring system according to the fourth embodiment is substantially identical in construction to the system of the first embodiment shown in FIGS. 1 and 2.

At step S41 of FIG. 11, controller 5 preliminarily stores a radio wave output value map (database) of a transmitter provided in each of tires 1, 2, 3 and 4 at front left position FL, front right position FR, rear left position RL and rear right position RR; and clear a memory area for temporarily storing (external) identification codes of neighboring vehicles. Then, controller 5 proceeds to step S42.

At S42, controller 5 examiners whether an ignition switch of the vehicle is ON and at the same time the vehicle speed is higher than or equal to a predetermined speed (5 km/h). From S42, controller 5 proceeds to S43 in the case of YES, and returns to S41 in the case of NO without entering the ID registering mode. The condition of S42 is a condition excluding situations of tire rotation and replacement of transmitters.

At S43, controller 5 resets a number t of data receiving operations, to zero (t=0) as initial value, and then proceeds to S44. At S44, controller 5 receives data A from each transmitter, and proceeds to S45. At S45, controller 5 examiners whether ID of the received data A is identical to ID stored (as external ID) in the memory area for identification codes of neighboring vehicles. In the case of YES, controller 5 proceeds to S50, and discards the received data A. In the case of NO, controller 5 proceeds from S45 to S46.

At S46, controller 5 selects the position of receiver unit of a greatest signal strength among the receiver units, and selects the output value map on the assumption that ID of the data A currently being received is from the selected position. After S46, controller 5 proceeds to S47.

At S47, controller 5 examines whether all the output values (radio wave strength levels) from the transmitter received by the receiver units are within the range of the output value map selected at S46. From S47, controller 5 proceeds to S51 in the case of YES, and to S48 in the case of NO.

At S48, controller 5 considers that the data A is from another vehicle, discards the data A, and then proceeds to S49. At S49, controller 5 stores ID of the data A as external ID from another vehicle, and returns to S42. Once ID is stored as external ID of another vehicle, ID is excluded from ID registration during vehicle running operation.

At S51, controller 5 regards the tire position selected at S46 as an ID registration candidate position because all the output values (radio wave strength levels) from the transmitter received by the receiver units are within the range of the output value map selected at S46. From S51, controller 5 proceeds to S52.

At S52, controller 5 counts up the number t of data receiving operations (t=t+1), and then proceeds to S53. At S53, controller 5 examines whether the number t of receptions reaches two. Then, controller 5 proceeds to S54 when T=2, and returns to S42 when t=1.

At 554, controller 5 completes the registration of ID at that tire position since that tire position is selected twice as the candidate, and then proceeds to S55. At S55, controller 5 examines whether the ID registration is completed for all the four wheels. Controller 5 ends this registration process in the case of YES, and returns to S42 in the case of NO.

Figure 12:
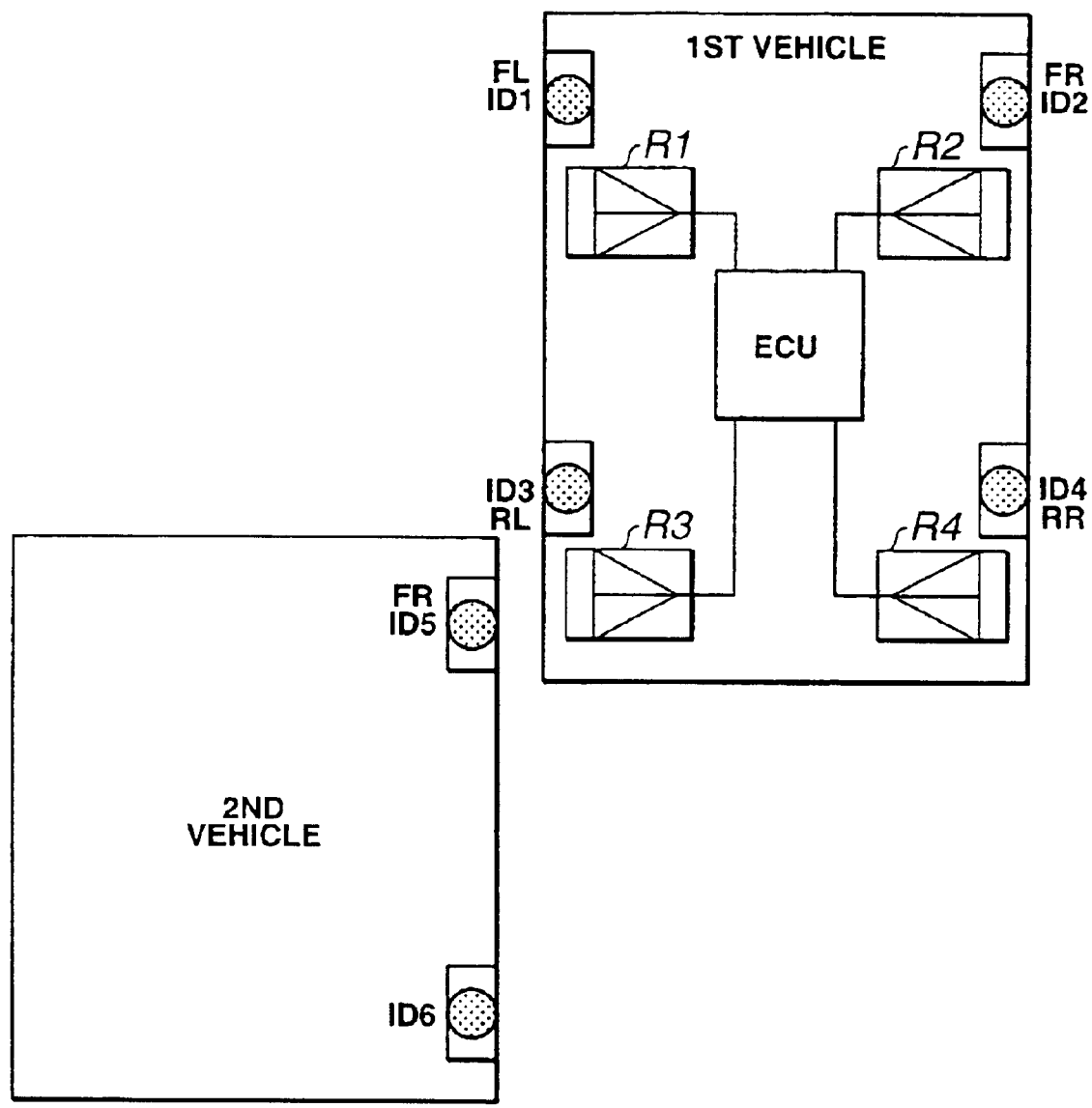
FIG. 12 is a schematic view for illustrating operations of the monitoring system of FIG. 11 when another vehicle comes closer from behind.

When, for example, a second vehicle approaches a first vehicle from behind on the left side as shown in FIG. 12, the tire pressure monitoring system according to the fourth embodiment provided in the first vehicle operates as follows.

If the third receiver unit R3 on the rear left tire position of the first vehicle receivers strong radio waves from an FR transmitter ID5 of the second vehicle, and the signal strength of transmitter ID5 of the neighboring second vehicle continues to be greater than that of transmitter ID3 at the rear left position of the first vehicle for a time longer than a predetermined length, then the tire pressure monitoring system of the first vehicle might register ID5 of the second vehicle as ID of the rear left tire of the first vehicle. To avoid such erroneous registration, it is necessary to set a long time such as 10 minutes for comparison of wireless signal strengths before registration in the case of the first embodiment in consideration of time for the second vehicle to move apart from the first vehicle.

In the case of the fourth embodiment, by contrast, the tire pressure monitoring system takes the route of S41→S42→S43→S44→S45→S46, and selects, at S46, the output value map (as shown by broken lines in FIG. 13) for the rear left position because the signal strength of ID5 of the second vehicle is greatest.

However, the characteristic of output values from ID5 of the second vehicle (as shown by solid lines in FIG. 13) is outside the tolerance (the range bounded between two broken lines in FIG. 13) of output value map for the rear left tire position. Therefore, controller 5 takes the route of S46→S47→S48→S49. Data A from another vehicle is destroyed at S48 and ID of another vehicle is registered as external ID of neighboring vehicles at S49 for next check at S45.

When there is no neighboring vehicle having similar transmitters, the output of transmitter ID3 is within the tolerance range of the rear left position, and hence the flow is S46→S47→S51→S52→S53→S42. When the rear left position is selected twice as candidate, the monitoring system follows the course of S53→S54→S55→S42 until ID registration is finished for all the four wheels.

Figure 13:
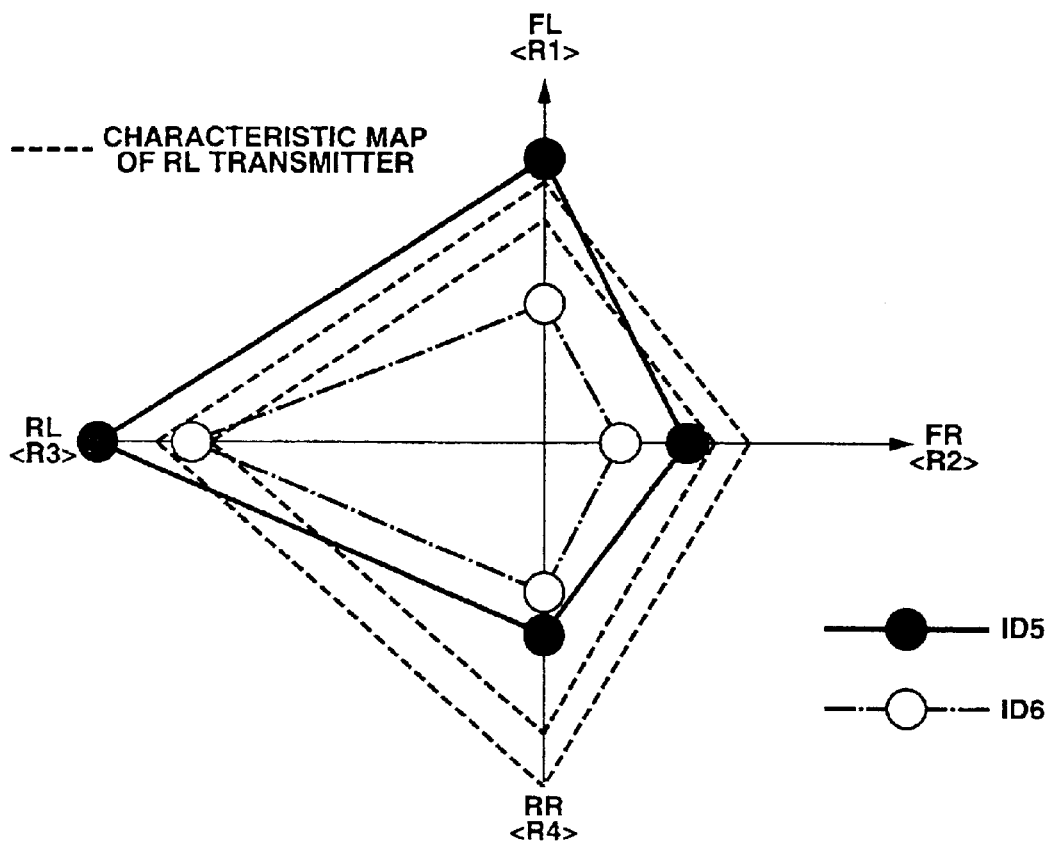
FIG. 13 is a view showing an output value map used at step S47 in the process of FIG. 11.

By using the output characteristic map as shown in FIG. 13, the tire pressure monitoring system according to the fourth embodiment can avoid undesired influence from neighboring vehicles equipped with similar tire pressure monitoring transmitters. The output characteristic map from each transmitter unit (ID3 at the rear left tire position, for example) is prepared in the form of a four-quadrant map, from wave strengths of radio waves received from the transmitter unit by the four receiver units. The positional relationship of each transmitter unit with respect to the four receiver units in the same vehicle is approximately fixed invariable, and the fourth embodiment discriminates transmitters of its own vehicle from transmitters of another vehicle by using this stable positional relationship.

When a plurality of wireless signals are received, the thus-constructed tire pressure monitoring system according to the fourth embodiment like the first embodiment measures the strengths of radio waves of the wireless signals received by receiver units R1~R4, and registers an identification code by comparing the strengths of radio waves of the wireless signals. Therefore, the tire pressure monitoring system can register tire identification codes accurately for four wheels at the four positions of a vehicle, and eliminate the need for troublesome tire pressure setting operations in the case of tire replacement or tire rotation.

Moreover, the tire pressure monitoring system according to the fourth embodiment can register identification codes accurately even if wireless signals are received from a vehicle nearby equipped with similar tire pressure monitoring transmitters.

Figure 15:
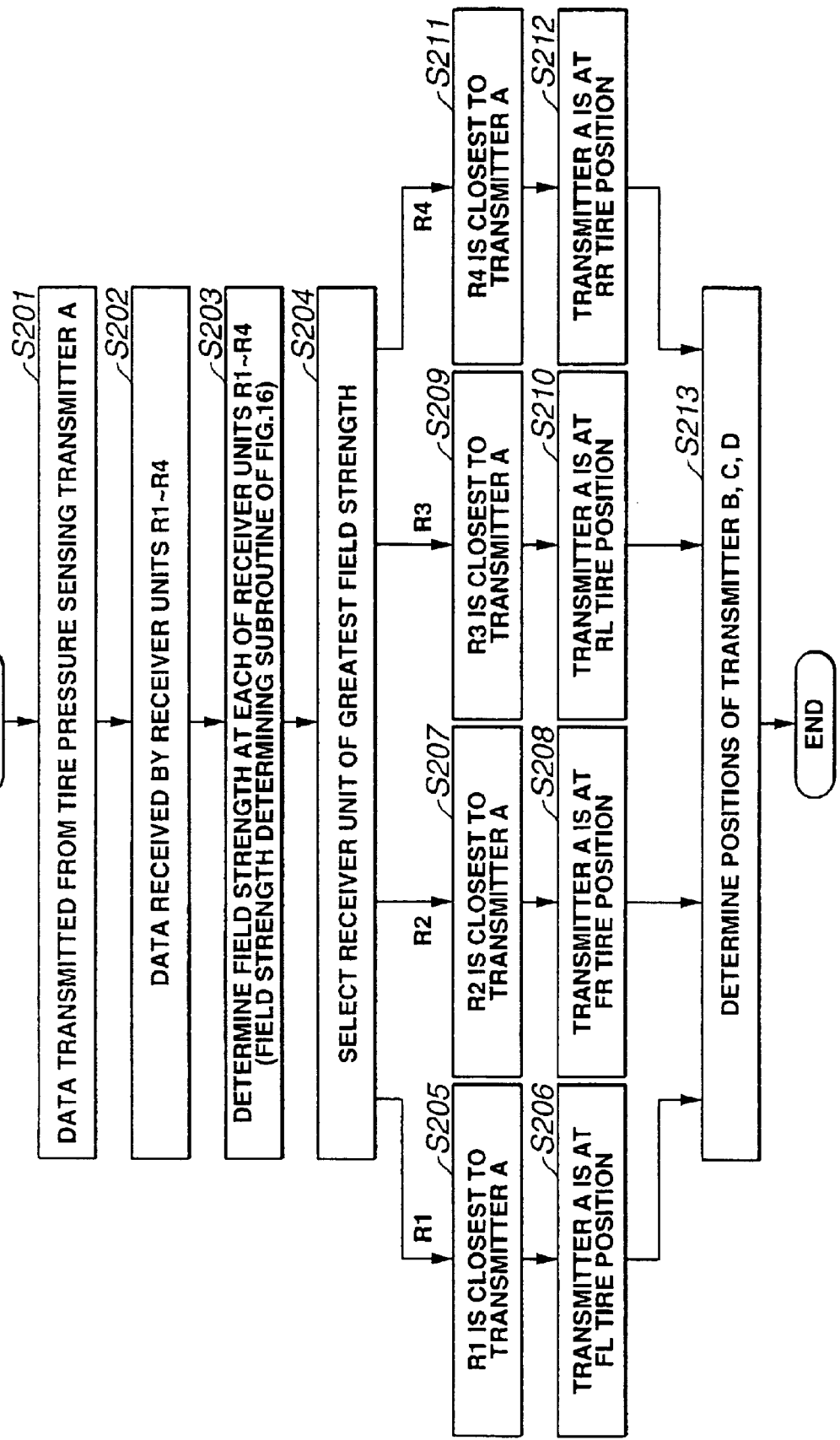
FIG. 15 is a flowchart of a tire position determining process performed by a tire pressure monitoring system according to a fifth embodiment.
Figure 16:
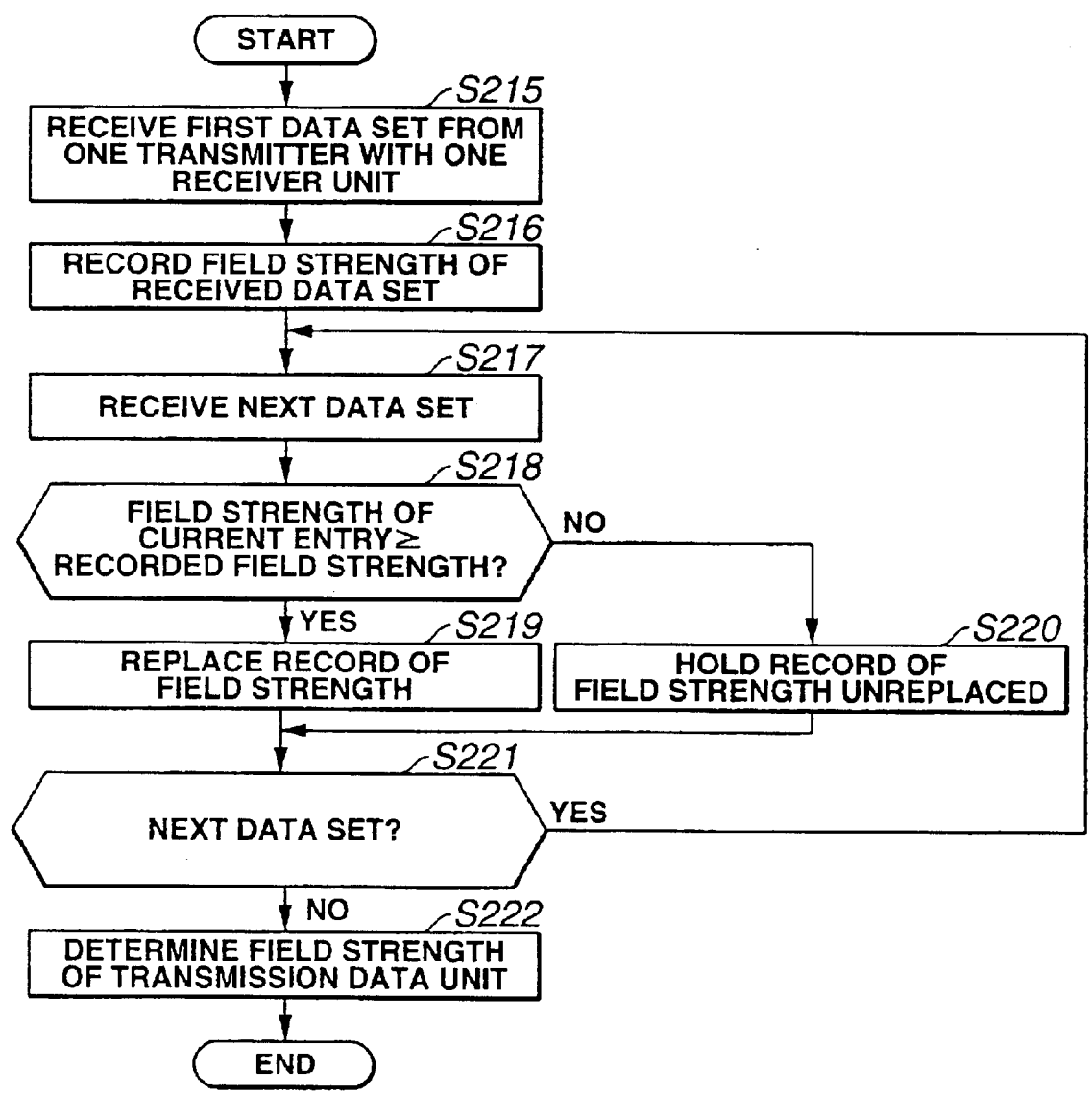
FIG. 16 is a flowchart of a field strength determining subroutine in the tire position determining process of FIG. 15.

FIGS. 15 and 16 show a tire pressure monitoring process according to a fifth embodiment of the present invention. A tire pressure monitoring system according to the fifth embodiment is substantially identical in construction to the system shown in FIGS. 1, 2 and 4.

Figure 14:
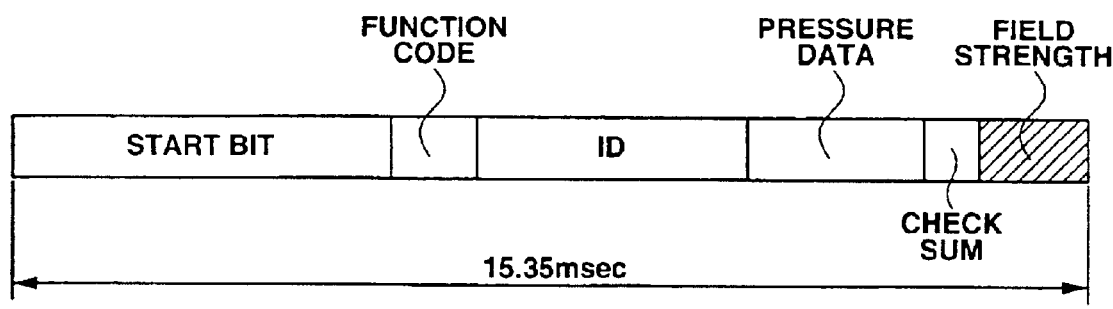
FIG. 14 is a view illustrating one transmission data unit from one tire pressure sensing transmitter.

FIG. 14 shows a transmission data set transmitted from each of four tire pressure sensing (or monitoring) (unregistered) transmitters A~B which can be used as transmitter units T1→T4. In this example, one transmission data set is composed of at least a start bit, a function code, ID, pressure data, check sum, and a portion of field strength, as shown in FIG. 14. Each transmission data set is contained within a time length of 15.3 msec.

FIG. 15 is a flowchart showing a tire position determining process according to the fifth embodiment. By this process, the monitoring system determines the position of each tire. (FIG. 15 corresponds to a tire position determining means.)

At S201, tire pressure monitoring or sensing transmitter A of a vehicle transmits data. At S202, receiver units R1~R4 receive the data. At S203, the tire pressure monitoring system determines the magnitude of field strength at each of receiver units R1~R4 (as shown in a field strength determining subroutine of FIG. 16). At S204, the system determines the receiver unit which receives a wireless signal of a greatest field strength.

When the field strength is greatest at first receiver unit R1, the system proceeds from S204, to S205 and S206, and concludes that the tire pressure monitoring transmitter A currently being examined is located at the position of the front left wheel adjacent to receiver unit R1.

When the field strength is greatest at second receiver unit R2, the system proceeds from S204, to S207 and S208, and concludes that the tire pressure monitoring transmitter A currently being examined is located at the position of the front right wheel adjacent to receiver unit R2.

When the field strength is greatest at third receiver unit R3, the system proceeds from S204, to S209 and S210, and concludes that the tire pressure monitoring transmitter A currently being examined is located at the position of the rear left wheel adjacent to receiver unit R3.

When the field strength is greatest at fourth receiver unit R4, the system proceeds from S204, to S211 and S212, and concludes that the tire pressure monitoring transmitter A currently being examined is located at the position of the rear right wheel adjacent to receiver unit R4.

At S213, the tire pressure monitoring system receives data transmitted from each of the remaining tire pressure monitoring transmitter B~D, and determines the position of each of the transmitter B, C and D in the same manner.

After the check of the tire positions for the tire pressure sensing transmitters as shown in FIG. 15, the tire pressure monitoring system compares the signal strengths or field strengths received at each tire position in the subsequent ID registration mode and register the identification code received with a greatest field strength as ID at that tire position, in EEPROM 5c.

FIG. 16 shows a field strength determining subroutine of step S203 in FIG. 16.

At S215, the tire pressure monitoring system receives a first data set with one receiver unit from one transmitter. At S216, the monitoring system records a field strength of the received data set. At S217, the monitoring system receives a second (next) data set. At S218, the monitoring system compares the field strength of the first data set and the field strength of the second data set and determines whether the field strength of the second data set is greater than the already-recorded field strength of the first data set. From S218, the monitoring system proceeds to S219 in the case of YES, and to S220 in the case of NO.

When the field strength of the next data set is greater than the field strength of the first data set, the monitoring system replaces the already-recorded field strength with a new entry of the field strength of the second data set at S219. When the field strength of the next data set is smaller than or equal to the field strength of the first data set, the monitoring system holds the already-recorded field strength unchanged, at S220.

At S221 following S219 or S220, the monitoring system examines where there is a next data set. In the case of YES, the system returns to S217, and repeats the program section of S217, S218, S219 and S221. When the eight data sets of one transmission data unit are all received, the monitoring system proceeds from S221 to step S222, and determine the field strength of the transmission data unit by employing the recorded field strength as a greatest field strength.

When first receiver unit R1 receives data from four tire pressure sensing transmitter units A, B, C and D, the field strength of reception from transmitter unit A is greatest, and the flow is S201→S202→S203→S204→S205→S206. At S206, the system concludes the position of transmitter unit A to be the front left wheel position of receiver unit R1.

When second receiver unit R2 receives data from four tire pressure sensing transmitter units A, B, C and D, the field strength of reception from transmitter unit B is greatest, and the flow is S201→S202→S203→S204→S207→S208. At S208, the system concludes the position of transmitter unit B to be the front right wheel position of receiver unit R2.

When third receiver unit R3 receives data from four tire pressure sensing transmitter units A, B, C and D, the field strength of reception from transmitter unit C is greatest, and the flow is S201→S202→S203→S204→S209→S210. At S210, the system concludes the position of transmitter unit C to be the rear left wheel position of receiver unit R3.

When fourth receiver unit R4 receives data from four tire pressure sensing transmitter units A, B, C and D, the field strength of reception from transmitter unit D is greatest, and the flow is S201→S202→S203→S204→S211→S212. At S212, the system concludes the position of transmitter unit D to be the rear right wheel position of receiver unit R4.

When a plurality of wireless signals are received, the thus-constructed tire pressure monitoring system according to the fifth embodiment compares the field strengths of radio waves, determines the tire position by determining the receiver unit of the greatest field strength. Therefore, the tire pressure monitoring system can register tire identification codes accurately for four wheels at the four positions of a vehicle, and eliminate the need for troublesome tire pressure setting operations in the case of tire replacement or tire rotation.

The field strength is determined by checking field strengths of a plurality of data sets as shown in the subroutine of FIG. 16. Therefore, the monitoring system can determine the field strength of each wireless signal properly and improve the accuracy of registration.

This application is based on a prior Japanese Patent Application No. 2003-067695 filed in Japan on Mar. 13, 2003; a prior Japanese Patent Application No. 2003-013541 filed in Japan on Jan. 22, 2003; and a prior Japanese Patent Application No. 2003-309773 filed in Japan on Sep. 2, 2003. The entire contents of these Japanese Patent Applications Nos. 2003-067695, 2003-013541 and 2003-309773 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A tire pressure monitoring apparatus comprising:

a plurality of transmitter units provided, respectively, for tires of a vehicle, each of the transmitter units includes a pressure sensor to sense a tire pressure of the corresponding one of the tires to determine a sensed tire pressure, and a transmitting device to transmit a wireless signal to covey information on the sensed tire pressure and a tire identification code for identifying the corresponding one of the tires;

a receiving section provided in the vehicle and arranged to receive the wireless signals from the transmitter units, the receiving section including a plurality of receiver units each provided near a unique one of the tires of the vehicle; and a controller to register the tire identification code of each tire, the controller being configured;

to measure signal strengths of wireless signals when the wireless signals are received by the receiving section; and to register the tire identification code of each tire by comparing the signal strengths.

2. The tire pressure monitoring apparatus as claimed in claim 1, wherein, when a plurality of the receiver units receive wireless signals containing an unregistered tire identification code, the controller compares strengths of radio waves received as the wireless signals containing the unregistered tire identification code by the receiver units, and registers the unregistered tire identification code at a tire position of the receiver unit receiving the wireless signal containing the unregistered tire identification code with a greatest radio wave strength.

3. The tire pressure monitoring apparatus as claimed in claim 1, wherein the controller is configured:

to measure a reception level of each of data sets contained in a wireless signal received by one of the receiver units;

to calculate a level difference of each data set between the reception level and a predetermined level threshold;

to calculate a sum of the level differences of the data sets;

to examine whether the sum of the level differences is greater than a predetermined sum threshold(S8); and to register the tire identification code of the wireless signal when the sum of the level differences is greater than the predetermined sum threshold.

4. The tire pressure monitoring apparatus as claimed in claim 3, wherein each of the transmitter units is configured to produce a wireless signal containing a plurality of consecutive data sets; and the controller is configured:

to calculate the sum of the level differences of consecutive data sets in each of wireless signals received by one of the receiver units;

to store each of the sums temporarily when the sum is greater than the predetermined sum threshold;

to calculate a total of the sums for each tire identification code by adding the sums for each tire identification code temporarily stored; and to register the tire identification code for which the total of the sums of level differences is greatest.

5. The tire pressure monitoring apparatus as claimed in claim 4, wherein the controller is configured to store each of the sums in a memory section when the sum is greater than the predetermined sum threshold and to discard data sets of a wireless signal IF the sum of the level differences of the wireless signal is smaller than or equal to the predetermined sum threshold.

6. The tire pressure monitoring apparatus as claimed in claim 4, wherein the controller is configured to accumulate, in a memory section, the sums of the level differences of wireless signals received during an interval which is defined by one of a predetermined time length and a predetermined number of data receiving operations.

7. The tire pressure monitoring apparatus as claimed in claim 2, wherein, if a tire identification code from one transmitter unit is selected for registration at a plurality of tire positions, the controller regards the transmitter unit as an exceptional transmitter unit; registers the tire identification code received from the exceptional transmitter unit by comparing the signal strengths of wireless signals received from the exceptional transmitter unit by the receiver units; and registers the tire identification codes received from the transmitter units other than the exceptional transmitter unit by comparing the signal strengths of wireless signals received by each receiver unit from the transmitter units other than the exceptional transmitter unit.

8. The tire pressure monitoring apparatus as claimed in claim 1, wherein the controller is configured to compare the signal strengths of wireless signals received from one of the transmitter units by the receiver units, and to register a tire identification code transmitted by the transmitter unit at a tire position of the receiver unit at which the signal strength is greatest.

9. The tire pressure monitoring apparatus as claimed in claim 1, wherein the controller is configured to store a signal reception level map of each of the transmitter units, and to register a tire identification code received by the receiver units by comparing the signal strengths of wireless signals received by the receiver units with reference to the signal reception level map.

10. The tire pressure monitoring apparatus as claimed in claim 1, wherein the controller is configured to compare the signal strengths of wireless signals received by one receiver unit from the transmitter units, and to register a tire identification code of the transmitter of a greatest signal strength at a tire position of the receiver unit.

11. The tire pressure monitoring apparatus as claimed in claim 1, wherein each of the transmitter units is configured to produce a wireless signal containing a plurality of consecutive data sets; and the controller is configured to determine the signal strength of each wireless signal in terms of a greatest one of the signal strengths of the data sets.

12. A tire pressure monitoring process comprising:

receiving wireless signals at a plurality of tire proximity positions in a vehicle from transmitter units provided, respectively, for tires of the vehicle, to sense a tire pressure of the corresponding one of the tires to determine a sensed tire pressure, and to transmit a wireless signal to covey information on the sensed tire pressure and a tire identification code for identifying the corresponding one of the tires;

measuring signal strengths of the wireless signals received at the tire proximity positions; and registering the tire identification code of each tire by comparing the signal strengths.

13. A tire pressure monitoring apparatus comprising:

transmitting means for transmitting wireless signals each containing information on a sensed tire pressure of a unique one of tires of a vehicle, and a tire identification code identifying the unique one of the tires;

receiving means for receiving the wireless signals from the transmitting means at tire proximity positions each located near a unique one of the tires of the vehicle;

measuring means for measuring signal strengths of the wireless signals; and registering means for registering the tire identification code of each tire by comparing the signal strengths.

* * * * *